Patented July 25, 1950

2,516,120

UNITED STATES PATENT OFFICE 2,516,120

OXIDATIVE METHOD OF PRODUCING 7-HYDROXYPHENOTHIAZONE-3

David F. Houston, El Cerrito, Calif., assignor to the United States of America as represented by the Secretary of Agriculture No Drawing. Application August 17, 1949, Serial No. 110,867

3 Claims. (Cl. 260—243)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to the preparation of 7-hydroxyphenothiazone-3 (also known as thionol). This compound is useful as a dyestuff, a dyestuff intermediate, a therapeutic agent, and as an intermediate for preparing other therapeutically useful materials.

One known method for preparing 7-hydroxyphenothiazone-3 involves heating phenothiazine with sulphuric acid for extended periods of time, i. e. 26–32 hours. The yield from this known process is low—about 4 to 8%. It has now been found that the desired product can be obtained in yields as high as 16% if phenothiazine is heated with sulphuric acid under particular conditions of temperature, concentration of sulphuric acid, and especially time of reaction. Thus the greatly increased yield is obtained when the temperature is in the range 160° C. to 170° C., the concentration of sulphuric acid is 75% to 90%, and the time of reaction is 5 to 7 hours. The time of reaction is particularly critical as will appear hereinafter.

The oxidation reaction which is utilized to prepare the 7-hydroxyphenothiazone-3 can be illustrated by the following equation:

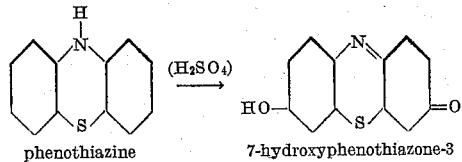

phenothiazine     7-hydroxyphenothiazone-3

The following examples disclose particular steps and conditions within the scope of this invention, but it is to be understood that these examples are furnished only by way of illustration and not limitation.

Example I 22 grams of phenothiazine was dissolved in 528 grams of 80% sulphuric acid in a one-liter flask equipped with an electric heater. The flask was then heated; it was noted that it took about 1 hour to bring the liquid to a temperature of 160°. The reaction mixture was maintained at 160° to 164° C. for 6 hours. At the end of that time, the reaction mixture was allowed to cool below 100° then poured into 700 cc. of ice cold water. The precipitated material was separated by filtration, the filtrate being discarded. The precipitate, after thorough water washing to remove all excess acid, was digested with one liter of boiling 0.7% aqueous sodium carbonate and filtered, the precipitate being re-digested with one liter of 0.6% aqueous sodium carbonate solution and filtered. The filtrates were combined and heated, then 25 grams of lithium chloride was added. The liquid was allowed to cool and the precipitated crystals of the lithium salt of 7-hydroxyphenothiazone-3 separated by centrifuging—3.9 grams of the lithium salt was obtained (15% yield). The 7-hydroxyphenothiazone-3 was obtained in the phenolic (unsalified) form by recrystallization from glacial acetic acid.

The experiment described above was repeated using various reaction times. The following results were obtained:

| Experiment No. | Reaction time, hours | Yield of 7-hydroxyphenothiazone-3, per cent |
|---|---|---|
| 1 | 3 | 0 |
| 2 | 9 | 11.2 |
| 3 | 18 | 5.2 |
| 4 | 26 | 3.8 |
| 5 | 32 | trace (less than 1%) |

Example II 22 grams of phenothiazine was heated at 161° to 165° C. for 6 hours with 470 grams of 90% sulphuric acid. The reaction mixture was cooled, then poured in 700 ml. of ice-cold water. The precipitated material was separated by filtration, the filtrate being discarded. The precipitate, after thorough washing with water to remove excess acid, was digested successively with one liter of 0.7% aqueous sodium carbonate solution and then with one liter of 0.6% aqueous sodium carbonate solution. The alkaline extracts were combined, heated and treated with 25 grams of lithium chloride. The liquid was allowed to cool and the precipitated crystals of the lithium salt of 7-hydroxyphenothiazone-3 were removed by centrifuging—4.3 grams of the lithium salt was obtained—16% yield. The 7-hydroxyphenothiazone-3 was prepared in its phenolic form by crystallization from acetic acid.

As pointed out above, 7-hydroxyphenothiazone-3 is prepared by reacting phenothiazine with sulphuric acid under particular conditions of temperature, concentration of sulphuric acid, and time of reaction. The proportion of phenothiazine to sulphuric acid is not critical. Generally, the acid is used in great excess so as to serve not only as the oxidizing agent but also as a solvent for the phenothiazine. Phenothiazine is soluble in concentrated sulphuric acid only to the extent of about 4 to 5% so that to react a maximum amount of the material it is preferred to use an approximately saturated solution of phenothiazine in sulphuric acid.

The product of the reaction can be isolated from the acid reaction mixture in several ways. The preferred method involves pouring the acid reaction mixture into an excess of cold water whereby the product, along with some impurities, is precipitated. This precipitate is then digested with a hot aqueous solution of a moderately strong alkaline material, i. e., sodium carbonate, potassium carbonate, borax, potassium tetraborate, ammonium hydroxide, and so forth. The alkaline solution dissolves the 7-hydroxyphenothiazone-3 which is then precipitated as its lithium salt by adding a water-soluble lithium salt to the alkaline liquor. Other metal salts can be used in place of the lithium salt, for example, barium, strontium lead salts, etc. However, lithium salts are preferred as they precipitate the product in a crystalline form. The product can be obtained in its phenolic form (unsalified form) by recrystallizing the lithium salt from glacial acetic acid. If desired, the product can be obtained directly in the unsalified form by acidifying the alkaline extract with an acid, for example, hydrochloric acid, sulphuric acid, acetic acid, or by saturating the alkaline extract with carbon dioxide.

Having thus described the invention, what is claimed is:

1. A process for preparing 7-hydroxyphenothiazone-3 which comprises heating phenothiazine with sulphuric acid having a concentration from 75% to 90% at a temperature of from 160° to 170° C. for 5 to 7 hours.

2. A process for preparing 7-hydroxyphenothiazone-3 which comprises heating phenothiazine with sulphuric acid having a concentration from 75% to 90% at a temperature from 160° to 190° C. for six hours.

3. A process for preparing 7-hydroxyphenothiazone-3 which comprises heating phenothiazine with sulphuric acid having a concentration from 75% to 90% at a temperature from 160° C. to 170° C. for a period of time from 5 to 7 hours, then cooling the resulting mixture and isolating the formed 7-hydroxyphenothiazone-3.

DAVID F. HOUSTON.

REFERENCES CITED

The following references are of record in the file of this patent:

UNITED STATES PATENTS

| Number | Name | Date |
|---|---|---|
| 522,897 | Herzberg et al. | July 10, 1894 |
| 1,497,720 | Herz et al. | June 17, 1924 |
| 2,162,686 | De Eds et al. | June 13, 1939 |

FOREIGN PATENTS

| Number | Country | Date |
|---|---|---|
| 269,748 | Germany | Jan. 31, 1914 |

OTHER REFERENCES

Pollak et al., Chem. Abstracts, vol. 25 (1931), pages 1505–1506.

De Eds et al., Chem. Abstracts, vol. 32 (1938), page 8428.

Beller, Bull. Nat'l Formulary Con., vol. 10 (1942), page 87.